(12) United States Patent
Wu et al.

(10) Patent No.: US 7,428,222 B1
(45) Date of Patent: *Sep. 23, 2008

(54) METHOD OF BUS CONFIGURATION TO ENABLE DEVICE BRIDGING OVER DISSIMILAR BUSES

(75) Inventors: Zong Liang Wu, San Diego, CA (US); Ronald B. Lee, San Diego, CA (US); Yusuf Ozturk, San Diego, CA (US)

(73) Assignee: Entropic Communications Inc., San Diego, CA (US)

( * ) Notice: Subject to any disclaimer, the term of this patent is extended or adjusted under 35 U.S.C. 154(b) by 730 days.

This patent is subject to a terminal disclaimer.

(21) Appl. No.: 10/789,059

(22) Filed: Feb. 27, 2004

Related U.S. Application Data

(60) Provisional application No. 60/450,966, filed on Feb. 28, 2003.

(51) Int. Cl.
*H04L 12/28* (2006.01)
*G06F 13/36* (2006.01)

(52) U.S. Cl. .................. 370/257; 710/312
(58) Field of Classification Search ............ 370/257
See application file for complete search history.

(56) References Cited

U.S. PATENT DOCUMENTS

| | | | | |
|---|---|---|---|---|
| 6,418,493 B1 * | 7/2002 | Mosgrove | ............ | 710/104 |
| 6,738,843 B2 * | 5/2004 | Bennett | ............ | 710/104 |
| 6,920,509 B1 * | 7/2005 | Matsuda | ............ | 710/8 |
| 6,925,518 B2 * | 8/2005 | Rudland et al. | ............ | 710/313 |
| 6,973,087 B2 * | 12/2005 | Lym et al. | ............ | 370/394 |
| 7,043,542 B2 * | 5/2006 | Sato et al. | ............ | 709/223 |
| 7,251,703 B1 * | 7/2007 | Wu et al. | ............ | 710/312 |
| 2003/0204660 A1 * | 10/2003 | Saito et al. | ............ | 710/305 |
| 2005/0165965 A1 * | 7/2005 | Henry et al. | ............ | 709/249 |

* cited by examiner

*Primary Examiner*—Chau Nguyen
*Assistant Examiner*—Timothy J Weidner
(74) *Attorney, Agent, or Firm*—Michael W. Landry; Bruce W. Greenhaus

(57) ABSTRACT

Several local IEEE1394 buses are bridged together over a second bus type to create a global bus wherein each local bus node is able to address nodes across the global bus without the local nodes being aware of the bridging operation. A bridging device operates by translating local bus node addresses to a global bus for communication over the second bus type. Alternatively, the local bus node identification process is controlled by the bridging device operating as the root node to cause the local nodes to be identified with a node address that is unique for the global network. The second bus type operates as a backbone for the global network and can be any type of communication bus or network with capability to transport the local bus traffic. The bridging devices that interface the local IEEE1394 buses to the backbone contain portals specific to each bus type that can communicate data between the dissimilar buses.

2 Claims, 5 Drawing Sheets

METHOD OF BUS CONFIGURATION TO ENABLE DEVICE BRIDGING OVER DISSIMILAR BUSES

RELATED APPLICATIONS

This application claims priority from U.S. provisional application No. 60/450,966 filed Feb. 28, 2003 entitled "Communication bridge between incompatible networks", incorporated herein by reference.

BACKGROUND

1. Field of the Invention

The present invention relates to digital buses and specifically to bridging data from one bus type over another bus type.

2. Prior Art

IEEE1394 bus configuration process: Single bus

IEEE1394 bus configuration process consists of three steps: bus initialization, tree identify, and self identify. (refer to IEEE Std 1394-1995, pages 307-319).

Bus initialize: A bus reset is generated whenever there is a topology change, for example when a node is connected into or disconnected from the bus. Each port keeps the connection status and checks the change of the status.

Tree identify: After the bus initialize, the tree identify process translates the general network topology into a tree, where one node is designated as a root and all of the physical connections have a direction associated with them pointing towards the root. Each port can notify its directly connected port as its probable parent. If two neighboring ports notify each other at the same time, a random back off is used to resolve the competition. The port which waits the longest after the bus reset to start participating in the tree identify process becomes the root of the bus. This provides a way for the user to choose one particular node as the root node.

Self identify: The self identify process uses a deterministic selection process to let each node on the bus to identify itself by generating and sending a packet containing its physical ID. The physical ID is simply the count of the number of times a node passes through the state of receiving self-ID packets from other nodes before having its own opportunity to do so. The root node passes control of the bus to the node attached to its lowest numbered connected port and waits for that node to signal that it and all of its children nodes have identified themselves. The root then passes control to its next highest port and waits for that node to finish. When the nodes attached to all the ports of the root are finished, the root itself does a self identify. The children nodes uses the same process in a recursive manner. The IEEE1394 is an all-pass bus where each node sees the self-ID packet of every other node.

After the root has sent its self-ID packet, every node can build up the bus topology based on the self-ID packets observed. Each node is aware of the existence of all the other nodes on the bus. There can be up to 63 nodes on a bus. If a new node is connected to the bus or an existing node is disconnected, the above bus configuration process will be triggered, so that each node has an updated view of the bus topology.

Multi-Bus Network

P1394.1 is being developed to bridge multiple IEEE1394 buses, each of which can have up to 63 nodes. Up to 1023 IEEE1394 buses can be bridged together. In P1394.1, each bus is an autonomous bus, with a unique bus ID. There are many desirable properties with this approach, such as:

Enabling a larger network, with Up to 1023 buses or 64K nodes

Each bus can be more efficient

Isolates local traffic, resulting in more usable bandwidth in the network

Isolates bus reset, resulting in a more stable network

Isolates local events from the rest of the network

Isolates medium-specific behaviors

Provides an open framework for bridging clusters of different medium and protocols However, P1394.1 bridges work correctly only with bridge-aware devices. A bridge-aware device has the following properties:

Aware that there may be more than a local bus in the network

Knows the difference between local node IDs and global IDs

Can discover remote devices (e.g., using DEP (Discovery and Enumeration Protocol))

Can determine and deal with remote timeouts

Can detect bridge portals on the local bus

Implements bridge-aware bit in Configuration ROM

Implements special registers:
 QUARANTINE
 MESSAGE_REQUEST, MESSAGE_RESPONSE

Understands new primary packet fields (e.g., proxy_ID)

This and other constraints (refer to chapter 9 of 1394.1 spec, Draft 1.04) mean that almost all current 1394 devices are non-compliant to the 1394.1 chapter 9, and thus cannot work as specified by P1394.1. In fact, these devices can even not detect the connect/disconnect of a remote device.

SUMMARY OF THE INVENTION

The approach of the present invention is to make bus bridges transparent for normal 1394 devices on the network that are not bridge-aware, by translating all nodes addresses that are physically located on different buses into a set of unique addresses that identify a logically single IEEE1394 bus (1394). The approach works with bridge-aware nodes and non-bridge aware nodes. The advantage here is that it supports both existing and future bridge-aware devices. With this embodiment of the invention, the total number of all nodes on the whole network is limited to 63 including the bridges, which is the limit of the node address range of a conventional 1394 bus. This limit is not a problem for most typical applications.

The invention employs a new sequence of performing the bus configuration process (including bus reset, tree identify, self identify), after which each 1394 node see a single network, consisting of up to 63 nodes. The 1394 portal of a bridge is equivalent to a repeater node with only the physical layer (PHY) active, seen from regular 1394 nodes.

FIG. 1 is a typical 1394 network bridged with another medium. The second bus can be selected from a number of bus candidates. One bus suitable for use is a developing standard referred to herein as 'Clink', which is an OFDM based network operating over coaxial cable wiring. Any second bus can be used to bridge 1394 data that meets the bandwidth requirements of the application and can encapsulate the 1394 data for transport between 1394 network branches with prescribed parameters for latency.

The second bus can be called a backbone bus, an infrastructure bus, or a distribution system bus. In P1394.1, the term BUS SEGMENT NUMBER is used to refer to a bus that is bridged to another bus.

FIG. 2 shows the equivalent single flat IEEE1394 network after topology identification process according to the present invention. Each 1394 node is seen by other nodes as a node address in a single 1394 network. The operation of bridging data from one 1394 network branch to another is transparent to the IEEE1394 nodes. Additionally, if the support of isochronous 1394 traffic is needed, the second bus also needs to have isochronous capability.

DETAILED DESCRIPTION

Figure 1:
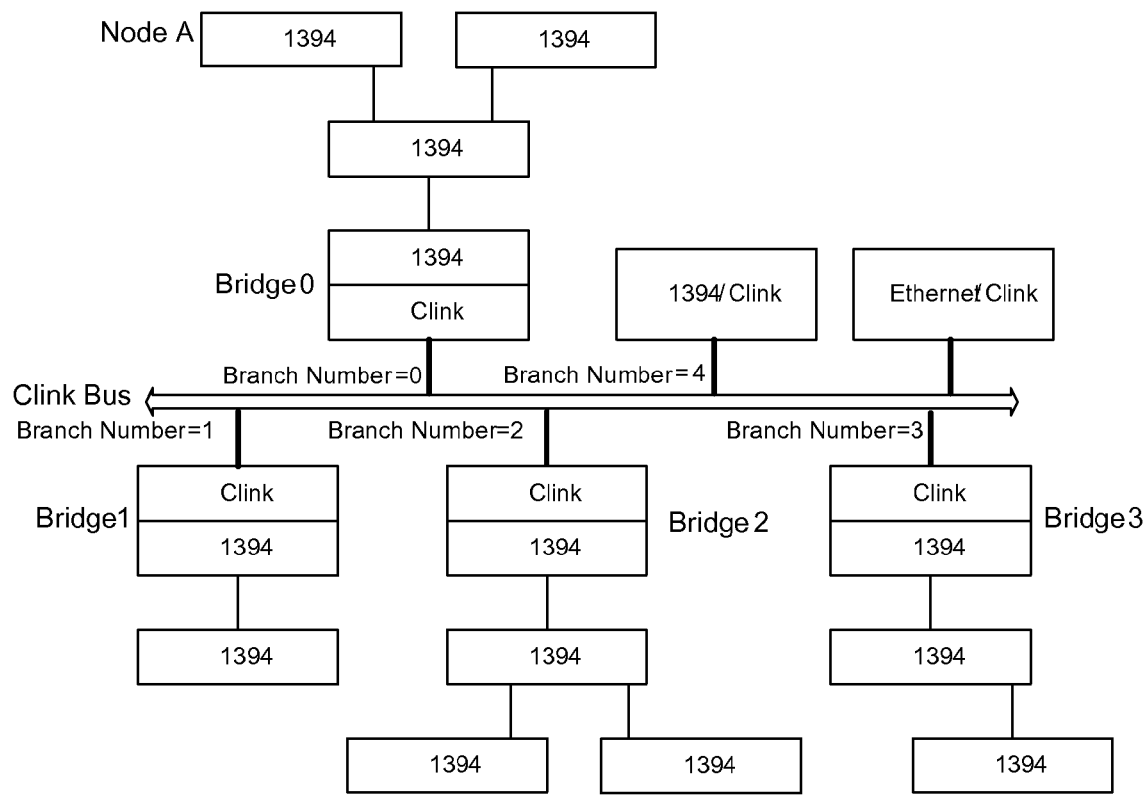
FIG. 1 shows the physical network topology and connection of bridged buses.
Figure 2:
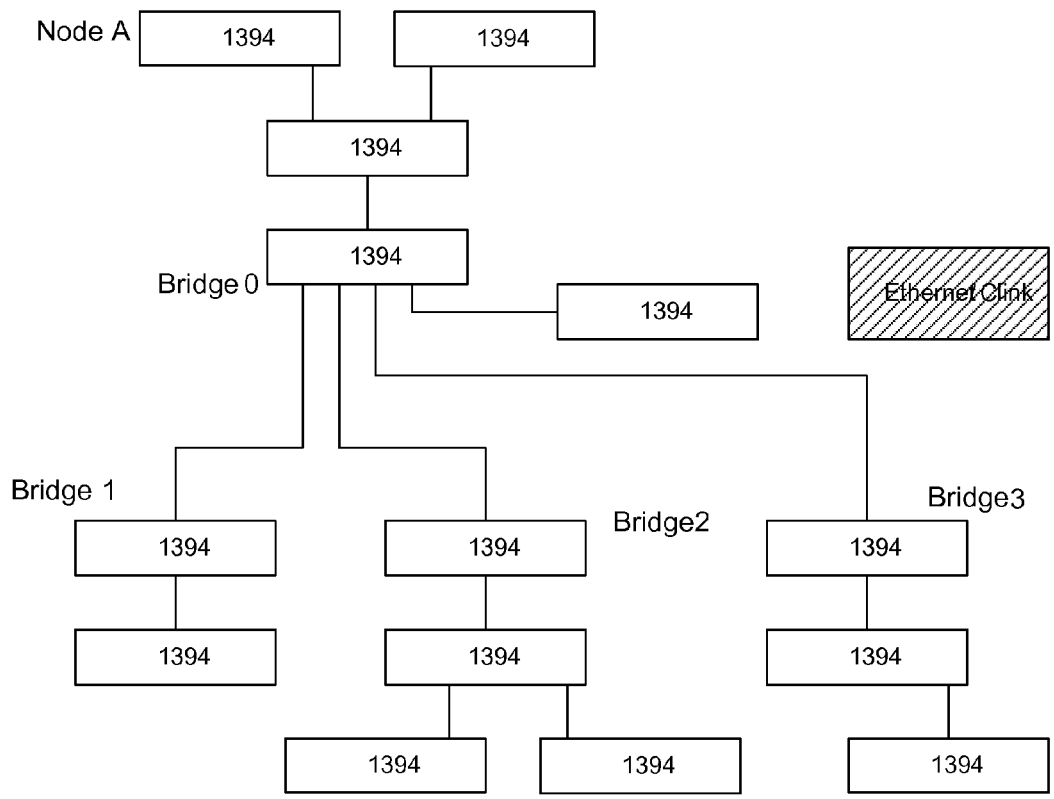
FIG. 2 shows the logical structure of the bridged buses according to the present invention.

The invention is described using a Clink coax cable bus as an example; other suitable buses can be used to bridge data between IEEE1394 network branches. The following is the sequence of states and events used for topology identification flow:

1. Clink coax cable stand alone, no C-node is connected.
2. First bridge is connected to the Clink bus. It becomes the Clink Cycle Master (CCM), and has Clink node number 0. When other bridges are connected, they are assigned appropriate Clink node number, like 1, 2, 3 etc. The Clink node number is also the branch number, B(n), of the corresponding branch. A native Clink node running a 1394 stack is also a 1394 branch. A native Clink node running Ethernet or MPEG is not considered as a 1394 branch, and is ignored for 1394 topology identification.
3. CCM requests all bridges to reset its corresponding branch, which will trigger the following process for each branch:
    Reset
    Tree-identification: the 1394 portal of the bridge is set to wait the longest and to become the root of the branch.
    When tree-id process is finished, the branch root PHY automatically starts and controls the self-id process, during which all nodes on the branch transmit their self-id packets. The branch root is the last node to transmit its own self-id packet. The branch root collects all the self-id packets, and knows how many nodes are on the branch because its own self-id contains the value.
    Let NB be the number of branches in the network. Each branch has a unique branch number I ranging from 0 to NB−1. NN(i) be the number of nodes on branch i. Total number of IEEE1394 nodes is the sum of NN(i) for I=0 to NB−1, and is noted as TNN.
4. Each bridge sends its collection of local self-id packets to the CCM. CCM builds up a database of self-id packets including all nodes in the network. CCM then sends this database to all bridges.
5. Each bridge translates the physical id of a remote node into a unique virtual local node id. The virtual local node id is meaningful and useful for the local nodes that consider these remote nodes as logically local upon receiving and decoding the self-id packets containing the virtual local id. The legacy IEEE1394 has only awareness of physical node id, not virtual local node id. The local nodes see each other directly through their respective physical ids, and do not need a separate virtual local node id. Remote node ids are assigned numbers above local node physical ids. After the local id to virtual local id translation, all the nodes have their ids numbered from 0 to TNN−1. A phantom node is then added which has a virtual local node id of TNN.
6. The phantom node functionally consists of two parts: the local part acting locally as cycle master and bus manager of its branch, and global part acting globally as isochronous resource manager (IRM) and root of the overall flat 1394 network. Physically, the local part is embodied in the 1394 portal of the bridge; the global part is embodied in the 1394 co-portal of the CCM. We assume CCM is always the Clink co-portal of a bridge for simplicity. The phantom node generates cycle start packet for its branch. A 1394 node issues a request for bandwidth or channel to the IRM (using a lock request message), which may be on the local branch or on a remote branch.
7. When the self-id translation in step 5 is finished, each bridge will initiate a new bus configuration process (bus reset, tree identify, self identify), but this time, the self identify process is modified by the branch root which transmits the translated self-id packets from remote nodes (which are also the virtual local nodes), after sending its own self-id packet. The switching from the end of the bridge's self-id packet to the sending of the translated self-id packets for the remote nodes is possible because of well-defined PHY interface and its interaction with the link layer at the transition time from the bus configuration process to the normal arbitration process. Local nodes see a virtual image of the remote nodes thanks to the translated self-id packets of the remote nodes. The translated self-id packets from remote nodes are sent in a well-defined order, so that each local node will receive them and thus can deduct a flat topology from all self-id packets received. After the branch root has sent all the translated self-id packets, it will drive idle to the bus so that after a well-specified time gap, all nodes will be enabled to start arbitration for normal operation.
8. The overall net root is the phantom node located on branch 0. It is embodied in the 1394 co-portal of bridge 0. Each 1394 co-portal is designed to be Isochronous Resource Manager capable, so that the overall root (the phantom node) is also the IRM.
9. Before the end of step 7, there can be topology change:
    One or several bridges are connected or disconnected: this is detected by CCM;
    One or several 1394 nodes are connected or disconnected: this is detected by the branch root, which in turn informs CCM;
    Then the steps 3 to 7 are done again.

The result is that within a 1394 branch network, for each local physical node, its virtual local id as contained in its self-id packet is identical to its real physical id. Real physical ids always starts from 0 and increment by 1 up to the total number of local nodes minus 1. For each remote node, the 1394 bridge portal of the bridge is its proxy, and its virtual local node id is contained in the self-id packet generated by the bridge portal in the name of the remote device. The virtual local node id starts at (total number of local nodes) and increments by 1.

The bridging medium can be wired or wireless, like 802.11a/b/g, Hiperlan, Ethernet, or Clink. The requirements on this bridging medium is that it has a maximum latency smaller than the SPLIT_TIMEOUT value in the 1394 nodes (typically 100 ms).

If the 1394 nodes want to use isochronous channels, the medium must also support isochronous channels (as Hiperlan does) or something equivalent to isochronous channels with the help of appropriately sized data buffers, and provide a mechanism so that all isochronous packets for a given channel has a constant delay over the medium. The medium may also need to update the timestamp in the original 1394 packets to account for the extra constant time delay introduced by the medium network.

Enough bandwidth needed for two 1394 nodes separated by bridges.

Traffic Routing Over Bridges 1394 data transactions consist of asynchronous packets and isochronous packets. The two types of packets are routed using different mechanisms.

Asynchronous Packet Routing

Each branch-root keeps a global topology map, composed of branches. Since each asynchronous packet has a destination_ID, when the branch-root receives a packet from its local bus, it first checks the local/remote parameter in the topology map to see if the packet is for a local node or for a remote node, by looking at the destination_ID. If the destination_ID is a local node, then the branch-root discards the packet, and waits for next packet. If it's for a remote node, then the branch-root finds out the branch ID of the destination node using the topology map; translates the virtual destination_ID into local destination_ID; forwards the packet and the branch ID to the Clink co-portal; the Clink co-portal then sends the packet over the Clink network to another Clink co-portal at the exit bridge; the Clink co-portal of the exit bridge then forwards the packet to its 1394 co-portal; which then sends the packet to its local bus.

Isochronous Packet Routing

Each bridge proactively finds out what local 1394 isochronous channels it needs to pass through from the 1394 to the Clink domain, what Clink packets it needs to pass through from the C-portal to the 1394 portal, and accordingly sets up stream connection on its own, without needing a controller node. Each bridge can do this by assuming that all 1394 devices are compliant to IEC61883-1 for transporting isochronous stream. Such devices use IEC61883-1 isochronous data flow management registers oMPR, oPCR, iMPR, iPCR.

At the end of the bus configuration process (reset; tree identify; self identify), each branch-root reads (oMPR, oPCR, iMPR, iPCR) registers of all nodes on all branches. Afterwards, each branch-root snoops Clink-crossing asynchronous packets at offset of registers (oMPR, oPCR, iMPR, iPCR), to monitor any change, for example addition or removal of stream connections.

For each listening plug (iPCR), find out if there is a corresponding talking plug (oPCR) on the branch.

If yes: then local isoch traffic.

If no: then talker is on a remote branch, and the C portal will pass all isoch packet with that channel number.

For each talking plug (oPCR), find out all the corresponding remote listening plug (iPCR)

If there is no remote listening plug, the isoch packet with this channel will remain local.

If there is one remote listening plug, the C portal will forward all packets of this channel to the corresponding remote C portal, using point-to-point connection.

If there are more than one remote listening plugs, the C portal will forward all packets of this channel to all corresponding remote C portals, using multicast connection, with GCD for the listening nodes only, not all nodes.

Time Synchronization

For each bridge, the Clink portal and its 1394 co-portal uses the same clock. The virtual 1394 cycle master is located on every 1394 co-portal, which is also the branch root. All 1394 nodes on a given branch are synchronized to the virtual cycle master.

Figure 3:
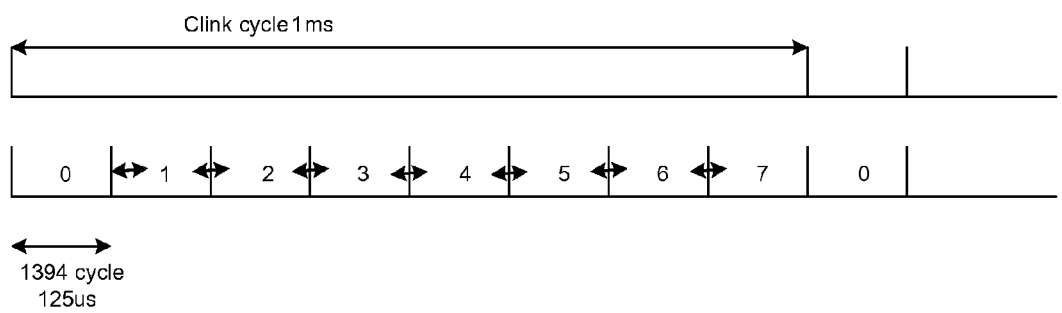
FIG. 3 shows the relationship between cycles of two dissimilar buses.
Figure 4:
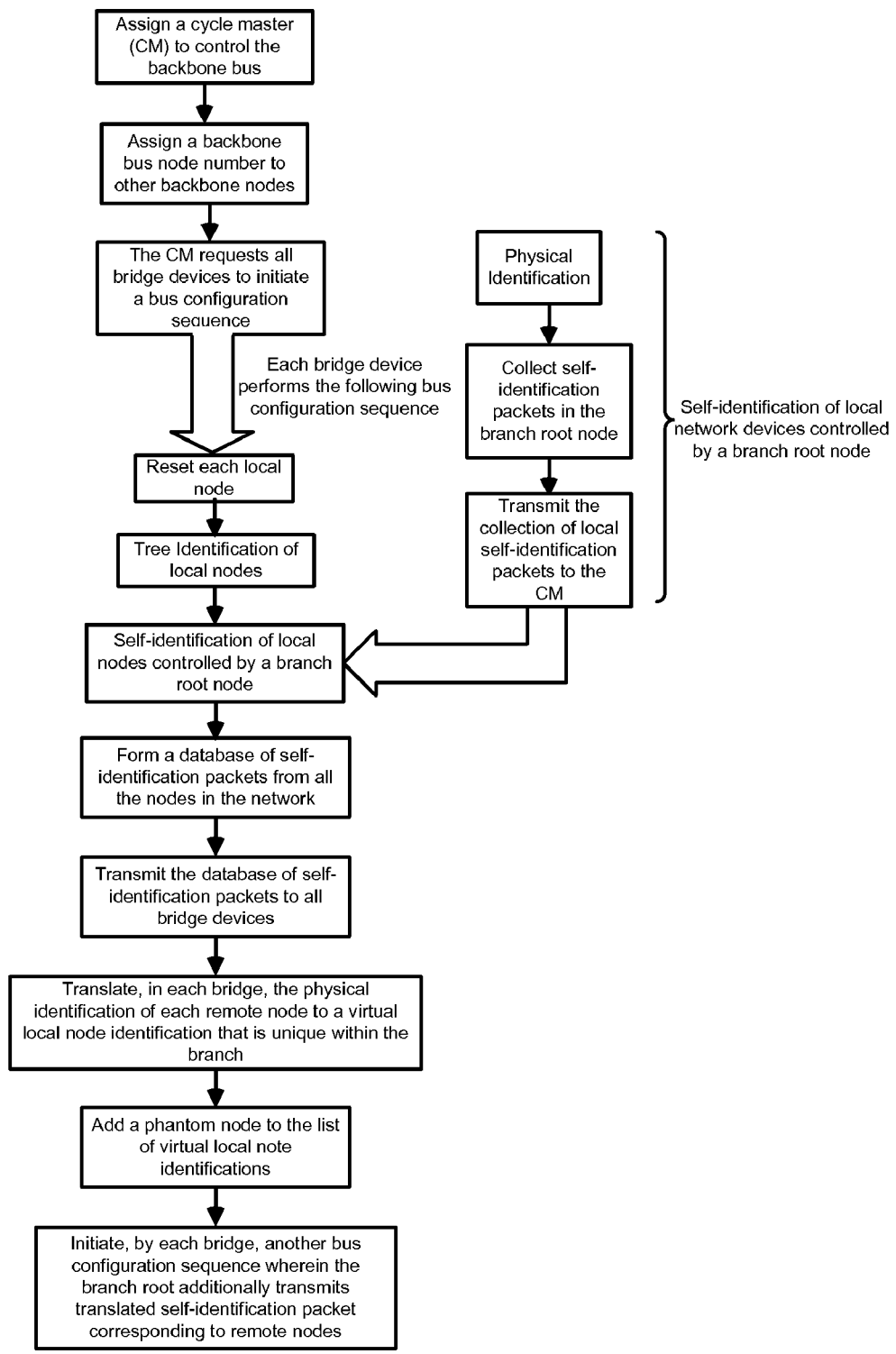
FIG. 4 shows a method of bridging nodes that are not bridge aware from one bus branch through a backbone bus to another bus branch.
Figure 5:
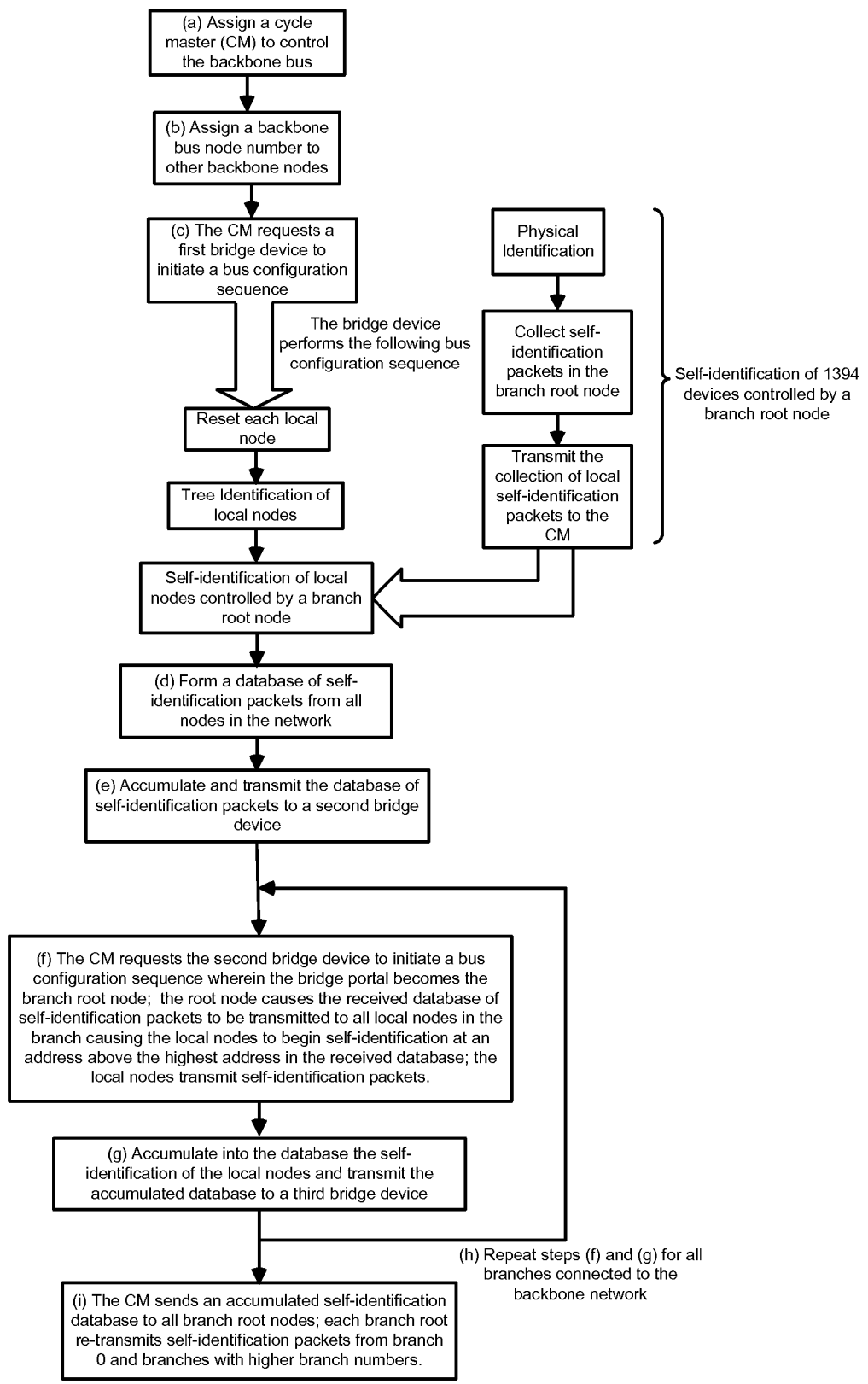
FIG. 5 shows another method of bridging nodes that are not bridge aware from one bus branch through a backbone bus to another bus branch.

FIG. 3 shows the relationship between a Clink cycle and 1394 cycles. In a standard 1394 bus, the cycle start packet may be pushed out if an asynchronous packet is in transmission at the end of the nominal cycle. To guarantee a normal streaming between two 1394 nodes across Clink, the virtual cycle master needs to guarantee the phase synchronization, by holding the bus at the end of the 1394 cycle 7. Holding the bus is a low level signaling used in a 1394 bus. One node can hold the bus by driving a special signaling to the bus, using high bus arbitration priority to take over the bus and keep it so that other nodes cannot transmit.

In an alternative embodiment, the PHY layer is modified and the method of translation is according to the following sequence:

1. Clink coax cable stand alone, no C-node is connected.
2. First bridge is connected to the Clink. It becomes the Clink Cycle Master, and has Clink node number 0. When other bridges are connected, they are assigned appropriate Clink node number, like 1, 2, 3 etc. The Clink node number is also the branch number, B(n), of the corresponding branch.
3. CCM requests bridge 1 to reset its corresponding branch, which will trigger the bus configuration process of the branch. At the end of the process, the branch root collects all the self-id packets, and knows how many nodes are on the branch because its own self-id contains the value.
4. Bridge 1 sends its collection of local self-id packets to bridge 2. Bridge 2 builds up a database of self-id packets received so far from all remote nodes in the network.
5. CCM requests bridge 2 to reset its corresponding branch, which will trigger the bus configuration process of the branch. The 1394 portal of the bridge is set to wait the longest and to become the root of the branch. When tree-id process is finished, the PHY of the branch root indicates this to the link layer, and the link layer first sends out the self-id packets accumulated in its database, so that all local nodes will see them, and increments their respective self_ID_count. Then the branch root starts and controls the self-id process for the nodes on this branch, during which all nodes on the branch transmit their self-id packets. The branch root is the last node to transmit its own self-id packet.
6. Bridge 2 sends its collection of both remote and local self-id packets to bridge 3.
7. Repeat steps 5 and 6 for each bridge, until all branches are done, the branch 0 being the last.
8. CCM sends its accumulated self-id database to all other branch roots, and each branch root re-transmits self-id packets from branches with higher branch numbers than itself and additionally branch 0 self-id. When this is done, each node in the net will have seen the self-id packets of all other nodes, and logically all nodes are on the same single 1394 bus.

9. If the net topology has changed during the above process, the whole process is started again.

What is claimed is:

1. A method of bridging local nodes that are not bridge aware from one bus branch through a backbone bus to another bus branch, each bus branch having a bridge device comprising a bridge portal and a backbone portal, the bridge device having control over local nodes in the branch, the method comprising the steps of:

assigning a cycle master (CM) to control the backbone bus;

assigning a backbone bus node number to other backbone nodes;

the CM requests all bridge devices to initiate a bus configuration sequence, the bridge devices performing the bus configuration sequence comprising:

resetting each local node;

tree-identification of local nodes;

self-identification of local nodes controlled by a branch root node, the self-identification comprising a physical-identification;

collecting self-identification packets in the branch root node;

transmitting the collection of local self-identification packets to the CM;

forming a database of self-identification packets from all nodes in the network;

transmitting the database of self-identification packets to all bridge devices;

translating, in each bridge, the physical-identification of each remote node to a virtual local node identification that is unique within the branch;

adding a phantom node to the list of virtual local node identifications; and initiating, by each bridge, another bus configuration sequence wherein the branch root additionally transmits translated self-identification packet corresponding to remote nodes;

whereby each local node addresses remote nodes using virtual local node identifications.

2. A method of bridging local nodes that are not bridge aware from one bus branch through a backbone bus to another bus branch, each bus branch having a bridge device comprising a bridge portal and a backbone portal, the bridge device having control over devices local nodes in the branch, the method comprising the steps of:

(a) assigning a cycle master (CM) to control the backbone bus;

(b) assigning a backbone bus node number to other backbone nodes;

(c) the CM requests a first bridge device to initiate a bus configuration sequence, the bridge device performing the bus configuration sequence comprising:

resetting each local node;

tree-identification of local nodes;

self-identification of local nodes controlled by a branch root node, the self-identification comprising a physical-identification;

collecting self-identification packets in the branch root node;

transmitting the collection of local self-identification packets to the CM;

(d) forming a database of self-identification packets from all nodes in the network;

(e) accumulating and transmitting the database of self-identification packets to a second bridge device;

(f) the CM requests the second bridge device to initiate a bus configuration sequence wherein the bridge portal becomes the branch root node; the root node causes the received database of self-identification packets to be transmitted to all local nodes in the branch causing the local nodes to begin self-identification at an address above the highest address in the received database; the local nodes transmit self-identification packets;

(g) accumulating into the database the self-identification of the local nodes and transmitting the accumulated database to a third bridge device;

(h) repeating steps (f) and (g) for all branches connected to the backbone network;

(i) the CM send an accumulated self-identification database to all branch root nodes; each branch root re-transmits self-identification packets from branch 0 and branches with higher branch numbers;

whereby each local node address is unique and is part of a single logical bus.

* * * * *